United States Patent
Watahiki et al.

(10) Patent No.: US 9,318,939 B2
(45) Date of Patent: Apr. 19, 2016

(54) MOTOR CONTROL DEVICE, IMAGE FORMING APPARATUS, AND MOTOR CONTROL METHOD

(71) Applicants: Tatsuya Watahiki, Kanagawa (JP); Natsuko Ishizuka, Kanagawa (JP)

(72) Inventors: Tatsuya Watahiki, Kanagawa (JP); Natsuko Ishizuka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 197 days.

(21) Appl. No.: 14/245,049

(22) Filed: Apr. 4, 2014

(65) Prior Publication Data
US 2014/0306635 A1    Oct. 16, 2014

(30) Foreign Application Priority Data

Apr. 16, 2013 (JP) ................................. 2013-085704
Mar. 3, 2014 (JP) ................................. 2014-040238

(51) Int. Cl.
| | |
|---|---|
| H02P 1/00 | (2006.01) |
| H02P 3/00 | (2006.01) |
| H02P 3/20 | (2006.01) |
| H02K 29/06 | (2006.01) |
| G03G 15/00 | (2006.01) |
| H02P 6/06 | (2006.01) |
| H02P 6/16 | (2006.01) |
| H02P 31/00 | (2006.01) |

(52) U.S. Cl.
CPC ............ *H02K 29/06* (2013.01); *G03G 15/5004* (2013.01); *G03G 15/55* (2013.01); *H02P 6/06* (2013.01); *H02P 6/165* (2013.01); *H02P 31/00* (2013.01)

(58) Field of Classification Search
CPC .................................. H02P 7/00; H02K 29/06
USPC .......................................................... 318/266
See application file for complete search history.

(56) References Cited

U.S. PATENT DOCUMENTS

| | | | | |
|---|---|---|---|---|
| 6,037,735 A | * | 3/2000 | Janosky | G05B 19/404 318/592 |
| 2002/0012549 A1 | * | 1/2002 | Oku | G03G 15/5008 399/167 |
| 2005/0154545 A1 | * | 7/2005 | Ramu | H02P 25/083 702/65 |
| 2009/0322470 A1 | * | 12/2009 | Yoo | A47B 88/0414 340/3.1 |
| 2013/0193894 A1 | | 8/2013 | Kiguchi et al. | |
| 2013/0200836 A1 | | 8/2013 | Ishizuka et al. | |
| 2013/0200838 A1 | | 8/2013 | Seki et al. | |
| 2014/0044466 A1 | | 2/2014 | Murata et al. | |
| 2014/0049199 A1 | | 2/2014 | Ishizuka et al. | |

FOREIGN PATENT DOCUMENTS

| | | |
|---|---|---|
| JP | 63-284414 | 11/1988 |
| JP | 2004-234039 | 8/2004 |
| JP | 2011-114951 | 6/2011 |

\* cited by examiner

*Primary Examiner* — Erick Glass
(74) *Attorney, Agent, or Firm* — Harness, Dickey & Pierce, P.L.C.

(57) ABSTRACT

A motor control device performs drive control of a motor connected to an object. The motor control device includes a rotation detection unit that detects rotation of the motor and outputs a detection signal, a counter unit that receives the detection signal from the rotation detection unit and outputs a count based on the received detection signal, and an error detection unit that receives counts from the counter unit at intervals of a reference period, computes a difference between a present count received from the counter unit and a previously received count, and detects that an error arises in the rotation detection unit when the difference is continuously less than a reference value.

8 Claims, 9 Drawing Sheets

FIG.6

| ENCODER PHASE A | ENCODER PHASE B | OPERATION |
|---|---|---|
| HIGH LEVEL | RISE EDGE | UP COUNTING |
| LOW LEVEL | FALL EDGE | |
| RISE EDGE | LOW LEVEL | |
| FALL EDGE | HIGH LEVEL | |
| HIGH LEVEL | FALL EDGE | DOWN COUNTING |
| LOW LEVEL | RISE EDGE | |
| RISE EDGE | HIGH LEVEL | |
| FALL EDGE | LOW LEVEL | |

MOTOR CONTROL DEVICE, IMAGE FORMING APPARATUS, AND MOTOR CONTROL METHOD

BACKGROUND OF THE INVENTION

1. Field of the Invention

The present invention relates to a motor control device, an image forming apparatus, and a motor control method.

2. Description of the Related Art

A motor control device which performs drive control of a DC motor is known. For example, the motor control device detects a rotational speed of a DC motor and carries out feedback control of the DC motor based on a difference between the detected rotational speed and a target rotational speed. For example, a rotary encoder may be used to detect a rotational speed of a DC motor.

For example, using a rotary encoder which outputs two-phase pulses with different phase angles in accordance with rotation of a DC motor, the motor control device may determine a movement distance of an object driven by the DC motor by computation of the movement distance through summation or subtraction of a pulse count based on the number of pulses according to the rotational direction of the DC motor.

In this motor control device, if pulses are not normally output from the rotary encoder, a rotational speed of the DC motor cannot be detected correctly. In such a case, the motor control becomes instable or inaccurate. To eliminate the problem, an encoder error detection method as disclosed in Japanese Laid-Open Patent Publication No. 2004-234039 has been proposed. In this method, if a pulse count based on pulses output by a rotary encoder when an actuator is being driven remains unchanged over a given period of time, it is detected that an error in the encoder arises, thereby disabling operation of the actuator.

In this connection, an example of computation of a cumulative movement distance of an object driven by the DC motor based on the pulses output from the encoder is considered. During reverse rotation of the DC motor, a pulse count based on the pulses output from the encoder is subtracted from the cumulative movement distance. During normal rotation of the DC motor, the pulse count based on the pulses output from the encoder is added to the cumulative movement distance.

It is assumed that, in this example, the DC motor is controlled to change the rotation of the DC motor from reverse rotation to normal rotation at a first instant. A target movement distance of the object driven by the DC motor is changed at the first instant. However, in actual operation, the timing that the rotation of the DC motor is changed from reverse rotation to normal rotation is delayed from the first instant. The cumulative movement distance of the object is changed at a second instant following the first instant.

In this example, the cumulative movement distance is decreased by subtraction of the pulse count during the reverse rotation of the motor, while the cumulative movement distance is increased by summation of the pulse count during the normal rotation of the motor. The cumulative movement distance is the basis for detecting whether an encoder error arises.

However, there may be a case where the motor control device receives the cumulative movement distances at the first instant before the second instant (when the rotation of the DC motor is actually changed) and a third instant after the second instant. In such a case, the motor control device determines that the cumulative movement distance received at the third instant remains unchanged from the cumulative movement distance received at the first instant. Hence, in this case, the motor control device may not detect any change of the received cumulative movement distance even when the pulses are normally output from the encoder.

Therefore, in such a case, the encoder error detection method disclosed in Japanese Laid-Open Patent Publication No. 2004-234039 may erroneously determine that the cumulative movement distance remains unchanged over the given period of time, thereby erroneously detecting an encoder error, even though the encoder operates normally.

SUMMARY OF THE INVENTION

In one aspect, the present invention provides a motor control device which is capable of preventing false detection of an encoder error.

In one embodiment, the present invention provides a motor control device which performs drive control of a motor connected to an object, the motor control device including a rotation detection unit that detects rotation of the motor and outputs a detection signal; a counter unit that receives the detection signal from the rotation detection unit and outputs a count based on the received detection signal; and an error detection unit that receives counts from the counter unit at intervals of a reference period, computes a difference between a present count received from the counter unit and a previously received count, and detects that an error arises in the rotation detection unit when the difference is continuously less than a reference value.

Other objects, features and advantages of the present invention will be more apparent from the following detailed description when read in conjunction with the accompanying drawings.

BRIEF DESCRIPTION OF THE DRAWINGS

FIG. 6 is a diagram for explaining the logic of the encoder output pulses according to the embodiment.

DETAILED DESCRIPTION OF THE PREFERRED EMBODIMENTS

A description will be given of embodiments with reference to the accompanying drawings.

Figure 1:
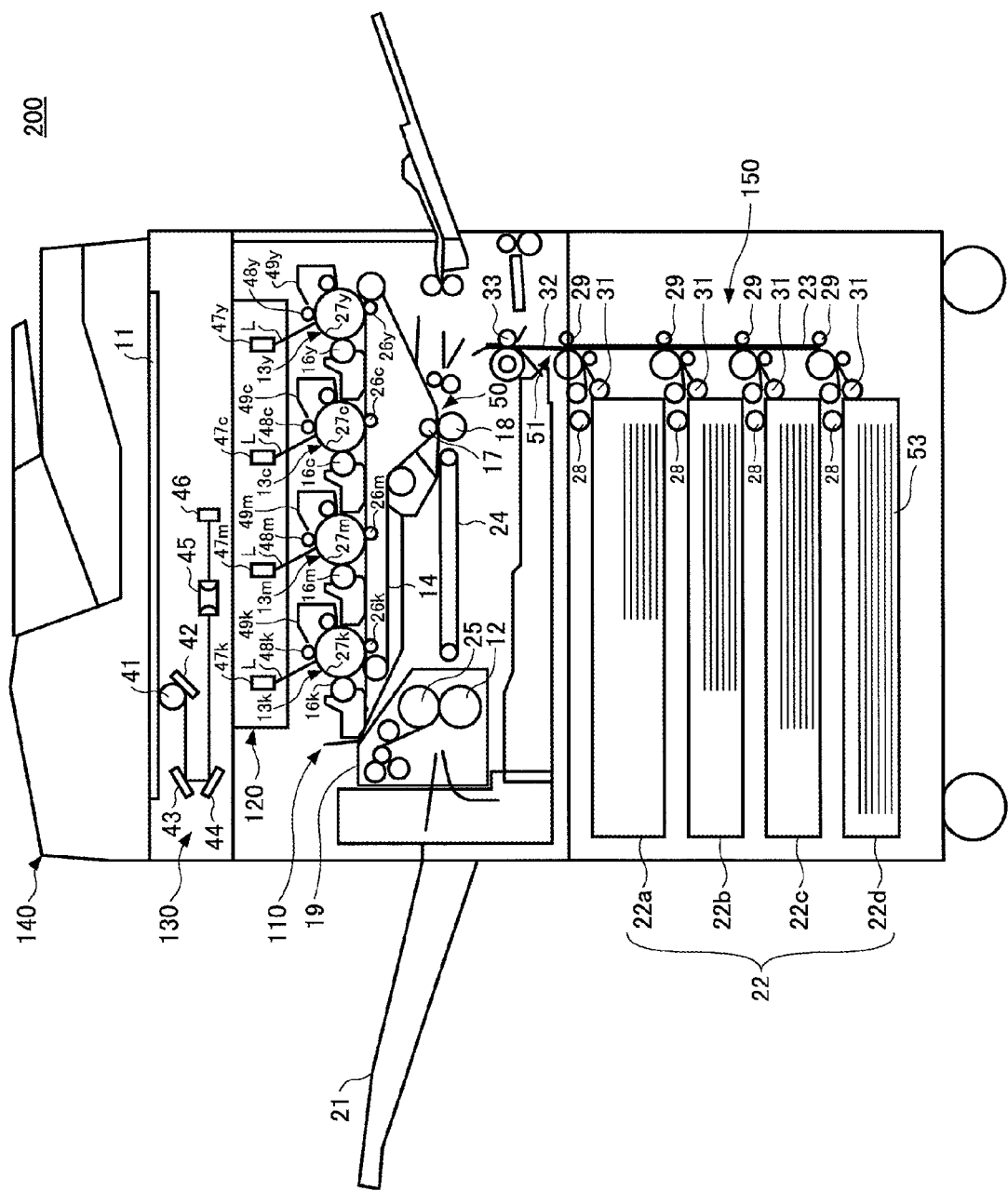
FIG. 1 is a diagram illustrating the overall structure of an image forming apparatus according to an embodiment.

FIG. 1 is a diagram illustrating an overall structure of an image forming apparatus 200 according to an embodiment. As shown in FIG. 1, the image forming apparatus 200 includes an automatic document feeder (ADF) 140, an image reading unit 130, an image formation unit 110, a writing unit 120, and a feed unit 150.

The ADF 140 feeds documents placed on a document feeding base one at a time to a contact glass 11 of the image reading unit 130. After image data is read from the document by the image reading unit 130, the ADF 140 ejects the document to a document ejection tray.

The image reading unit 130 includes the contact glass 11 on which a document is placed, an exposure lamp 41, a first mirror 42, a second mirror 43, a third mirror 44, a lens 45, and a charge-coupled device (CCD) 46. The exposure lamp 41, the first mirror 42, the second mirror 43, and the third mirror 44 are moved at a constant speed and scan the document sheet. The reflection light from the document is focused through the lens 45 onto a light reception surface of the CCD 46 so that photoelectric conversion of the incoming light is carried out.

After the image data produced by the photoelectric conversion of the CCD 46 is subjected to A/D (analog-to-digital) conversion by an image processing circuit (not illustrated), various kinds of image processing (gamma correction, color conversion, image separation, gray level correction, etc.) are performed on the digital image data in the image processing circuit.

The writing unit 120 includes exposure devices 47y, 47m, 47c, and 47k which are arranged to form electrostatic latent images of yellow (y), magenta (m), cyan (c), and black (k), respectively. When user's instructions for copying a document image or user's instructions for printing an image are received, the writing unit 120 forms the electrostatic latent images of the respective colors on photoconductor drums of the corresponding colors.

In the image forming apparatus 200, four photoconductor units 13y, 13m, 13c, and 13k on which toner images of the respective colors are formed are arrayed in a line along a transport direction of an intermediate transfer belt 14. The photoconductor units 13y, 13m, 13c, and 13k include photoconductor drums 27y, 27m, 27c, and 27k, charging devices 48y, 48m, 48c, and 48k, developing devices 16y, 16m, 16c, and 16k, and cleaning devices 49y, 49m, 49c, and 49k, respectively. In the following, reference characters y, m, c, and k, indicating the respective colors, will be omitted for the sake of convenience of description.

In the writing unit 120, the exposure device 47 uses, for example, an LED writing system which includes a light emitting diode (LED) array and a lens array. Each of the LEDs in the exposure device 47 emits a light beam of a corresponding one of the colors according to the image data produced by the photoelectric conversion, and the exposure device 47 forms an electrostatic latent image on the photoconductor drum 27.

The developing device 16 contains toner and includes a developing roller which is rotated to supply toner to the electrostatic latent image formed on the photoconductor drum 27. The developing device 16 forms the toner image of each color on the photoconductor drum 27.

The toner image of each color formed on the photoconductor drum 27 is transferred to the intermediate transfer belt 14 by superimposition at a primary transferring position where the photoconductor drum 27 and the intermediate transfer belt 14 are in contact with each other.

An intermediate transfer roller 26 is disposed at a position where the intermediate transfer roller 26 counters the photoconductor drum 27 via the intermediate transfer belt 14. The intermediate transfer roller 26 is pressed to contact the inner peripheral surface of the intermediate transfer belt 14, and the outer peripheral surface of the intermediate transfer belt 14 is caused to contact the surface of the photoconductor drum. A predetermined voltage is supplied to the intermediate transfer roller 26 and an intermediate transfer electric field is formed between the photoconductor drum 27 and the intermediate transfer belt 14 so that the toner image is transferred from the photoconductor drum 27 to the intermediate transfer belt 14. The toner images of the respective colors are transferred to the intermediate transfer belt 14 by superimposition and a full-color toner image is formed on the intermediate transfer belt 14.

A sheet transport operation is performed to transport a recording sheet 53 to arrive at a secondary transfer position 50 between a secondary transfer roller 18 and a repulsion roller 17 when the toner image formed on the intermediate transfer belt 14 arrives at the position of the secondary transfer roller 18, and the toner image is secondarily transferred to the recording sheet 53.

The recording sheet 53 is fed from any one of a first tray 22a, a second tray 22b, a third tray 22c, and a fourth tray 22d. Each of these trays 22a-22d includes a feed roller 28, a separation roller, and a transporting roller pair 29. The feed roller 28 feeds the uppermost recording sheet 53 on the recording sheets 53 contained in the sheet tray sequentially. The separation roller 31 separates the recording sheet 53 from the remaining recording sheets 53 and feeds the recording sheet 53 to a sheet transport path 23.

The transporting roller pair 29 sends the recording sheet 53 transported from the sheet feed tray 22, to the transporting roller pair 29 of the following stage and toward a sheet passage 32 to the image formation unit 110. After a leading end of the recording sheet 53 sent to the sheet passage 32 is detected by a registration sensor 51, the recording sheet 53 is contacted and nipped by a registration roller 33, and the sheet transport operation is temporarily stopped. The registration roller 33 sends the nipped recording sheet 53 to the secondary transfer position 50 at a predetermined timing. This predetermined timing is equivalent to the timing when the full-color toner image formed on the intermediate transfer belt 14 arrives at the secondary transfer position 50.

The full-color toner image on the intermediate transfer belt 14 is transferred to the recording sheet 53 lying at the secondary transfer position 50 between the secondary transfer roller 18 and the repulsion roller 17. The recording sheet 53 is transported to the fixing device 19 by a transporting belt 24.

The fixing device 19 includes a pressure roller 12 and a heat roller 25. By supplying heat and pressure of the fixing device 19 to the recording sheet 53, the full-color toner image is fixed to the recording sheet 53. The recording sheet 53 in which the full-color toner image is fixed by the fixing device 19 is ejected to an ejection tray 21.

In the present embodiment, the image forming apparatus 200 in which an image is formed on the recording sheet 53 by the electrophotographic printing method has been described. Alternatively, the image forming apparatus 200 may be an image forming apparatus utilizing another image formation method, such as an ink-jet printing method by which ink droplets are ejected to form an image on the recording sheet 53.

Figure 2:
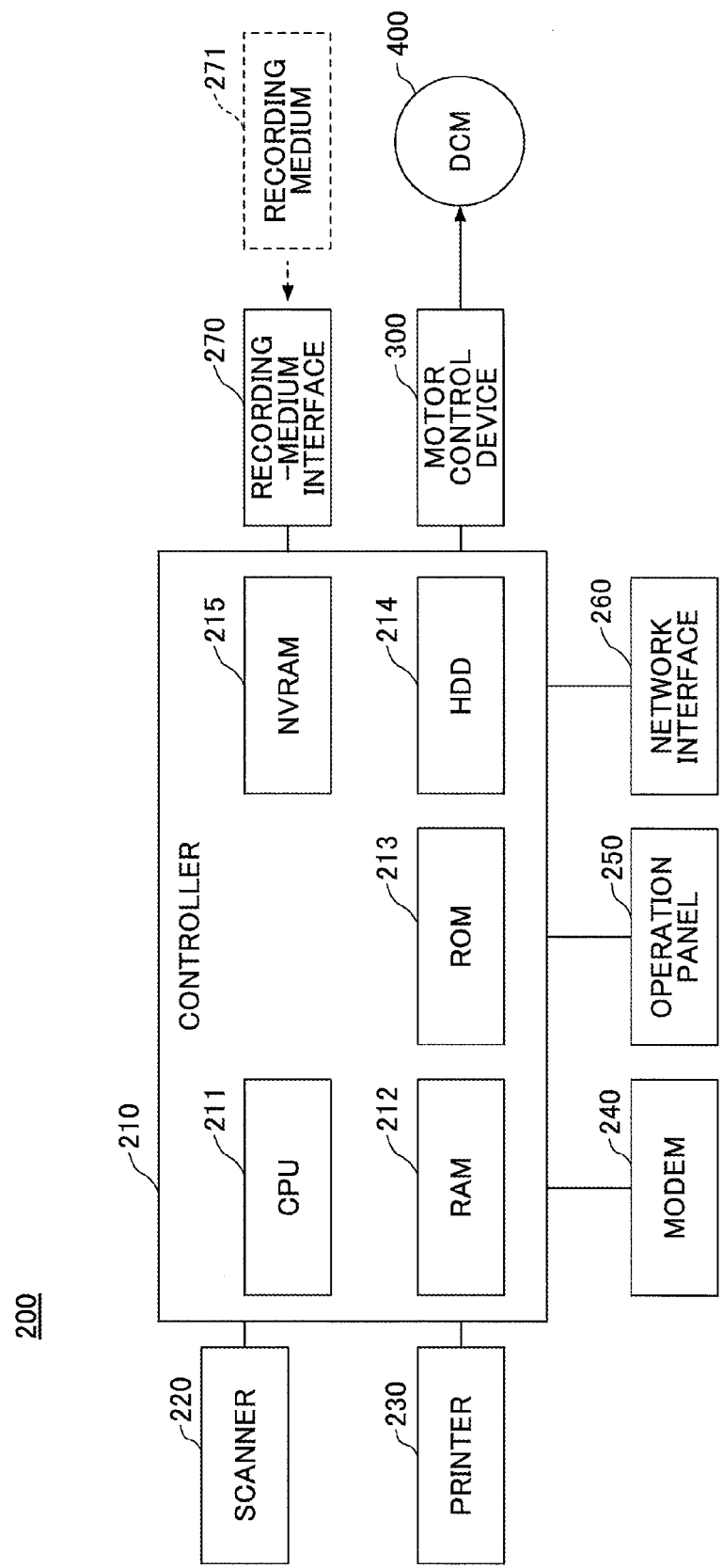
FIG. 2 is a block diagram illustrating a hardware configuration of the image forming apparatus according to the embodiment.

FIG. 2 is a block diagram illustrating a hardware configuration of the image forming apparatus 200 according to the embodiment.

As shown in FIG. 2, the image forming apparatus 200 includes a controller 210, a scanner 220, a printer 230, a modem 240, an operation panel 250, a network interface 260, a recording-medium interface 270, a motor control device 300, and a DC (direct current) motor (DCM) 400.

The controller 210 includes a CPU (central processing unit) 211, a RAM (random access memory) 212, a ROM (read-only memory) 213, a HDD (hard disk drive) 214, and a NVRAM (non-volatile RAM) 215. The ROM 213 stores various programs and data used by the programs. The RAM 212 is used as a storage area in which the programs are loaded and used as a work area of the loaded programs. Various kinds of functions of the image forming apparatus 200 are implemented by the CPU 211 executing the programs loaded on the RAM 212. The HDD 214 stores programs and various kinds of data used by the programs. The NVRAM 215 stores various kinds of setup information.

The scanner 220 is an image reading part for reading image data from a document and provided as a hardware element of the image forming apparatus 200. The printer 230 is an image formation part for printing an image on a recording sheet and provided as a hardware element of the image forming apparatus 200. The modem 240 is a hardware element provided for connecting the image forming apparatus 200 to a telephone line. The modem 240 is used to perform transmission and reception of image data based on FAX communication protocols. The operation panel 250 includes an input part implemented by keys and buttons for receiving various instructions input from a user, and an operation screen part implemented by a liquid crystal panel having a touch-panel function. The operation panel 250 is provided as a hardware element of the image forming apparatus 200.

The network interface 260 is provided as an interface for connecting the image forming apparatus 200 to a network, such as a local area network (LAN), (which may be a wired network or a wireless network). The recording-medium interface 270 is provided as an interface for connecting the image forming apparatus 200 to a recording medium 271. The image forming apparatus 200 is configured to perform reading and writing of information from and to the recording medium 271 by using the recording-medium interface 270. Examples of the recording medium 271 include a flexible disk, a CD (compact disk), a DVD (digital versatile disk), an SD (secure digital) memory card, a USB (universal serial bus) memory, etc.

The motor control device 300 performs drive control of the DC motor (DCM) 400. For example, the DC motor 400 is a brushless DC motor. The DC motor 400 is provided to rotate a target object in the image forming apparatus 200 which is any of the photoconductor drum 27, the feed roller 28, the transporting roller pair 29, etc. The motor control device 300 carries out feedback control of the DC motor 400 based on a predetermined target rotational position or target rotational speed and a detection result output by a rotary encoder.

Figure 3:
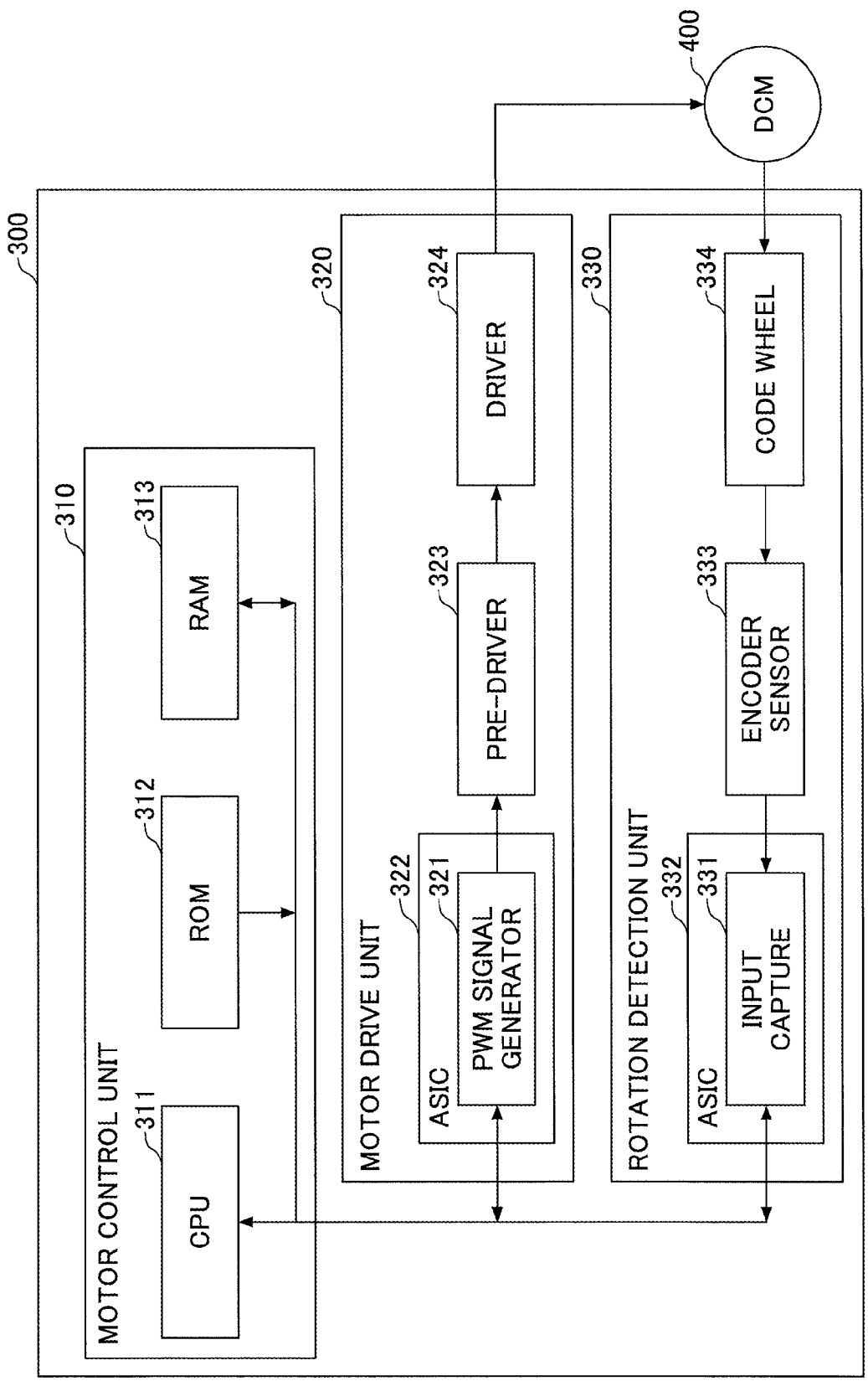
FIG. 3 is a block diagram illustrating a hardware configuration of a motor control device according to an embodiment.

FIG. 3 is a block diagram illustrating a hardware configuration of the motor control device 300 according to an embodiment. As shown in FIG. 3, the motor control device 300 includes a motor control unit 310, a motor drive unit 320, and a rotation detection unit 330, and performs drive control of the DC motor 400.

The motor control unit 310 includes a CPU 311, a ROM 312, and a RAM 313. The motor control unit 310 transmits a drive signal to the motor drive unit 320 based on a predetermined driving condition. The CPU 311 performs a control computation for controlling the DC motor 400, based on data stored in the ROM 312 and the RAM 313. The ROM 312 stores a motor control program for controlling the DC motor 400. The RAM 313 stores data which is temporarily used to perform the motor control.

As shown in FIG. 3, the motor drive unit 320 includes an ASIC (application-specific integrated circuit) 322 including a PWM signal generator 321, a pre-driver 323, and a driver 324.

The PWM signal generator 321 generates a PWM signal based on the drive signal received from the motor control unit 310. The pre-driver 323 generates a signal required for driving the DC motor 400 based on the PWM signal. The driver 324 amplifies the signal generated by the pre-driver 323 and outputs the amplified signal to the DC motor 400.

As shown in FIG. 3, the rotation detection unit 330 includes an ASIC 332 including an input capture 331, an encoder sensor 333, and a code wheel 334. The rotation detection unit 330 detects a rotational position of the DC motor 400, a rotational speed of the DC motor 400, or a movement distance of the object driven by the DC motor 400. The encoder sensor 333 optically reads the code wheel 334 mounted on the rotational shaft of the DC motor 400 during rotation and output pulses. The pulses are input to the input capture 331. The input capture 331 measures the number of the input pulses and the period of the input pulses.

In this embodiment, the encoder sensor 333 and the code wheel 334 are implemented by an incremental type rotary encoder which outputs two-phase pulses with different phase angles. The configuration of the rotation detection unit 330 according to the present disclosure is not limited to the configuration shown in FIG. 3, and may be any other configuration in which the rotation of the DC motor 400 is measurable.

Typically, the motor control unit 310 performs drive control of the DC motor 400 based on a target rotational speed of the DC motor 400 and an actual rotational speed of the DC motor 400 detected by the rotation detection unit 330, by using a feedback loop control, such as PID (proportional-integral-derivative) control.

Figure 4:
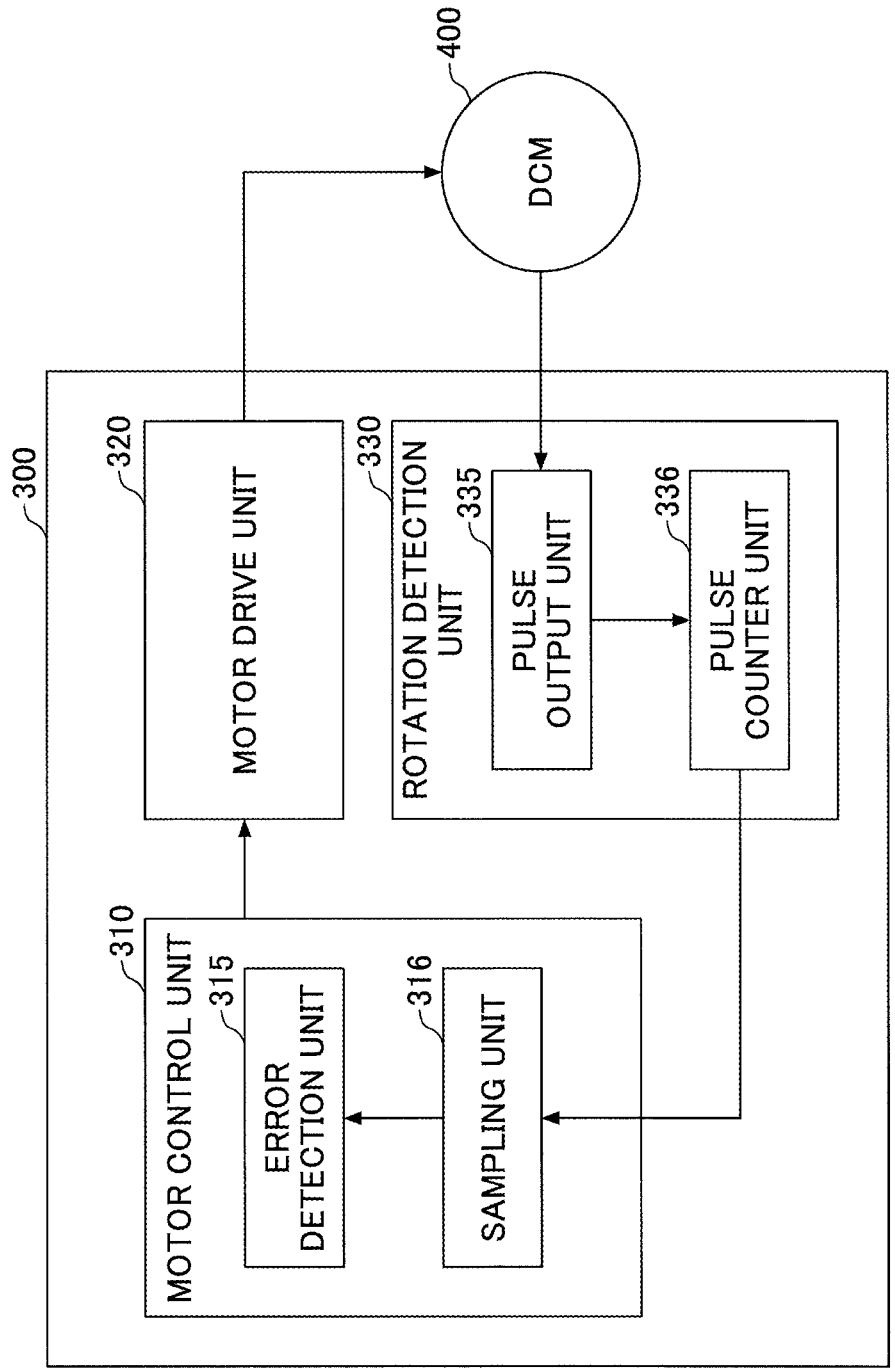
FIG. 4 is a block diagram illustrating a functional configuration of the motor control device according to the embodiment.

FIG. 4 is a block diagram illustrating a functional configuration of the motor control device 300 according to the embodiment. As shown in FIG. 4, the motor control device 300 includes an error detection unit 315, a sampling unit 316, a pulse output unit 335, and a pulse counter unit 336.

Figure 5:
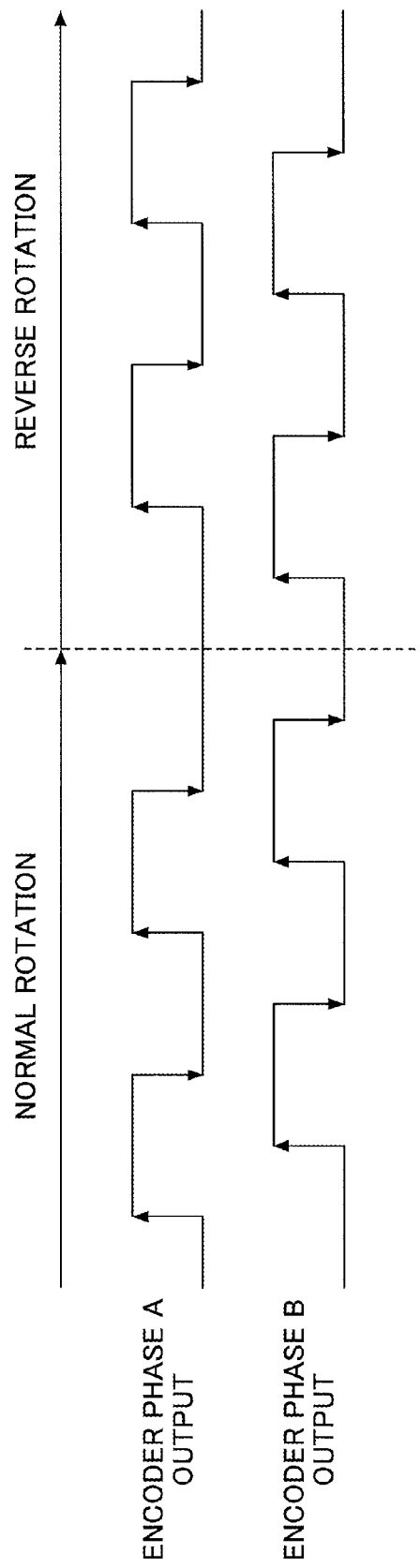
FIG. 5 is a diagram illustrating pulses output from an encoder according to the embodiment.

The pulse output unit 335 includes the encoder sensor 333 and the code wheel 334. The pulse output unit 335 is configured to detect the rotation of the DC motor 400 and output pulses as a detection signal. FIG. 5 is a diagram illustrating pulses output from a rotary encoder which is implemented by the encoder sensor 333 and the code wheel 334.

As illustrated in FIG. 5, the pulse output unit 335 is configured to output two-phase pulses with different phase angles, including encoder phase A pulses and encoder phase B pulses. During normal rotation of the DC motor 400, the pulse output unit 335 outputs the encoder phase A pulses and the encoder phase B pulses. The phase A pulses are advanced in the phase angle from the phase B pulses by 90 degrees. During reverse rotation of the DC motor 400, the pulse output unit 335 outputs the encoder phase A pulses and the encoder phase B pulses. The phase B pulses are advanced in the phase angle from the phase A pulses by 90 degrees.

The pulse counter unit 336 is configured to receive the two-phase pulses output from the pulse output unit 335, count the pulses based on a logic shown in FIG. 6, and determine a cumulative movement distance of the target object rotated by the DC motor 400. FIG. 6 is a diagram for explaining the logic of the encoder output pulses according to the embodiment.

As shown in FIG. 6, the pulse counter unit 336 performs up-counting or increments the count indicating the cumulative movement distance of the object if the encoder phase A pulse is at a "H" level and the encoder phase B pulse is at a rising edge. Moreover, if the encoder phase A pulse is at a "L" level and the encoder phase B pulse is at a falling edge, then the pulse counter unit 336 increments the count indicating the cumulative movement distance of the object. Furthermore, if the encoder phase A pulse is at a rising edge and the encoder phase B pulse is at a "L" level, the pulse counter unit 336 increments the count indicating the cumulative movement distance of the object. Moreover, if the encoder phase A pulse is at a falling edge and the encoder phase B pulse is at a "H" level, the pulse counter unit 306 increments the count indicating the cumulative movement distance of the object.

On the other hand, as shown in FIG. 6, if the encoder phase A pulse is at a "H" level and the encoder phase B pulse is at a falling edge, then the pulse counter unit 336 performs down counting or decrements the count indicating the cumulative movement distance of the object. Moreover, if the encoder phase A pulse is at a "L" level and the encoder phase B pulse is at a rising edge, then the pulse counter unit 336 decrements the count indicating the cumulative movement distance of the object. Furthermore, if the encoder phase A pulse at a rising edge and the encoder phase B pulse is at a "H" level, then the pulse counter unit 336 decrements the count indicating the cumulative movement distance of the object. Moreover, if the encoder phase A pulse is at a falling edge and the encoder phase B pulse is at a "L" level, then the pulse counter unit 336 decrements the count indicating the cumulative movement distance of the object.

In this way, based on the logic shown in FIG. 6, the pulse counter unit 336 increments the count (the up counting) during normal rotation of the DC motor 400 and decrements the count (the down counting) during reverse rotation of the DC motor 400. Hence, the pulse counter unit 336 determines the cumulative movement distance of the target object as the count obtained by counting the two-phase pulses with different phase angles output from the pulse output unit 335 based on the logic shown in FIG. 6.

In the motor control device 300 shown in FIG. 4, the sampling unit 316 is configured to receive the counts output from the pulse counter unit 336 at intervals of a reference period. This reference period may be set based on a movement distance of the object driven by the DC motor 400. Specifically, the reference period may be set to an arbitrary value based on a time required for a movement distance of the object driven by the DC motor 400 to reach a predetermined movement distance.

The error detection unit 315 is configured to detect whether an error arises in the encoder sensor 333 and the code wheel 334 of the rotation detection unit 330 based on the counts received at the intervals by the sampling unit 316.

The error detection unit 315 is configured to compute a difference between the present count received by the sampling unit 316 and the previously received count and detect that an error arises in the encoder sensor 333 and the code wheel 334 when the computed difference is continuously less than a reference value. This reference value may be set based on an expected movement distance of the object driven by the DC motor 400 for the reference period. Specifically, the reference value may be set to an arbitrary value based on an expected movement distance of the object driven by the DC motor 400 for the reference period for which the sampling unit 361 receives the count. For example, when it is desired to increase the level of accuracy of the error detection, the reference value is set to a relatively large value. On the other hand, when it is desired to continuously drive the DC motor 400 as long as possible, the reference value is set to a relatively small value (for example, when the count difference expected by the reception of the counts at the intervals is equal to 20 pulses, the reference value is set to 5). Moreover, the reference value may be automatically set up according to a predefined formula, based on the reception of the counts by the sampling unit 316 at the intervals.

The error detection unit 315 and the sampling unit 316 are implemented by the CPU 311 of the motor control unit 310 which executes the motor control program stored in the ROM 312 or the RAM 313.

Figure 9:
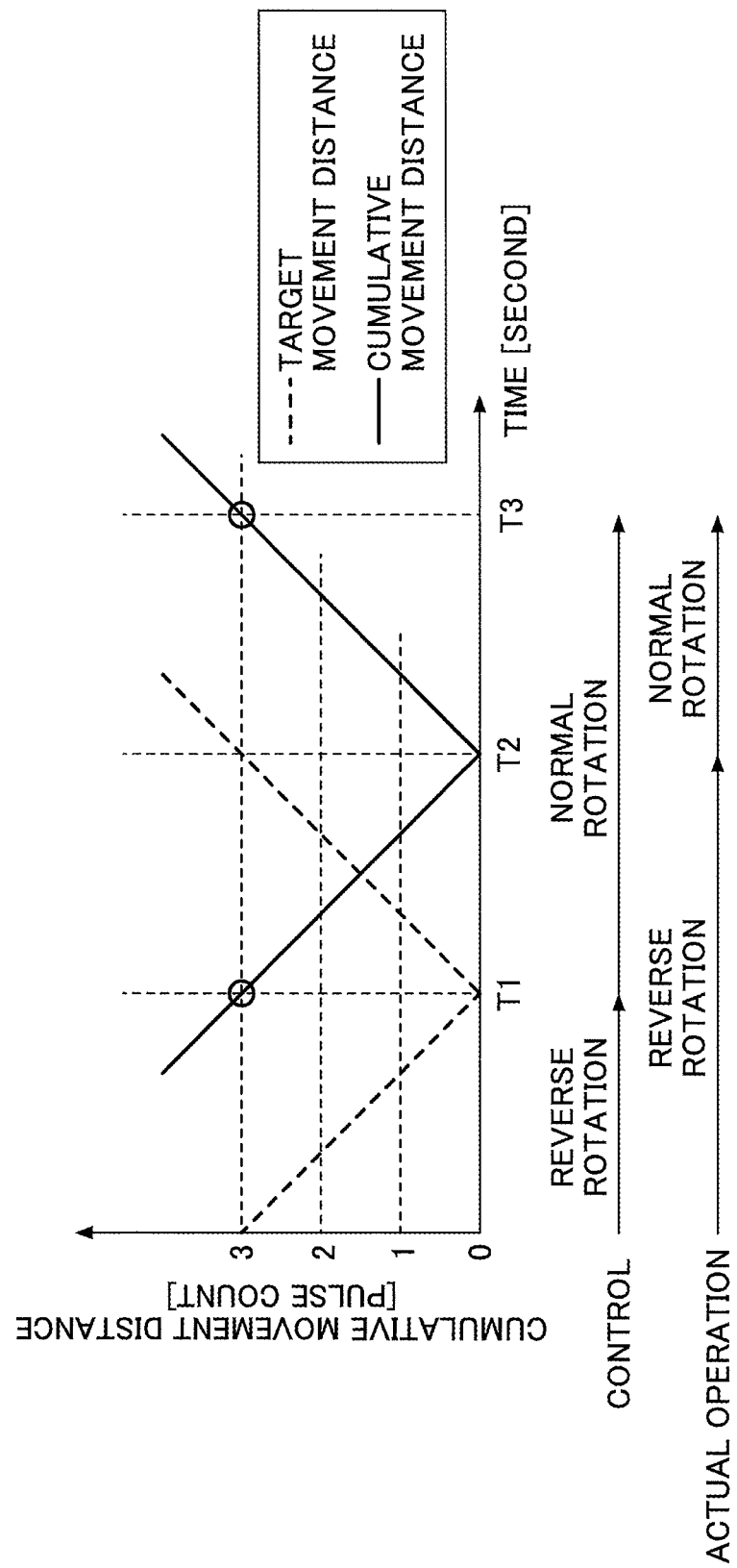
FIG. 9 is a diagram illustrating an example of computation of a target movement distance of an object driven by a DC motor and a cumulative movement distance of the object.

FIG. 9 is a diagram illustrating an example of computation of a target movement distance of an object driven by the DC motor and a cumulative movement distance of the object. As indicated by the dotted line in FIG. 9, the target movement distance is changed at time T1 by controlling the rotation of the DC motor to change from reverse rotation to normal rotation at time T1. However, in actual operation, the timing that the rotation of the DC motor is changed from reverse rotation to normal rotation is delayed from time T1. As indicated by the solid line in FIG. 9, the cumulative movement distance is changed at time T2 following time T1.

In this example, the cumulative movement distance is decreased by subtraction of the pulse count during the reverse rotation of the DC motor, while the cumulative movement distance is increased by summation of the pulse count during the normal rotation of the DC motor. The cumulative movement distance is the basis for detecting whether an encoder error arises.

There may be a case where the motor control device receives the cumulative movement distances at time T1 before time T2 (when the rotation of the DC motor is actually changed) and at time T3 after time T2, as indicated by the white circles in FIG. 9. In such a case, the motor control device determines that the cumulative movement distance received at time T3 remains unchanged from the cumulative movement distance received at time T1. Hence, in this case, the motor control device may erroneously detect that an error in the encoder arises, even though the encoder operates normally.

In order to eliminate the problem, the motor control device according to the embodiment is arranged to prevent false detection of an encoder error.

Figure 7:
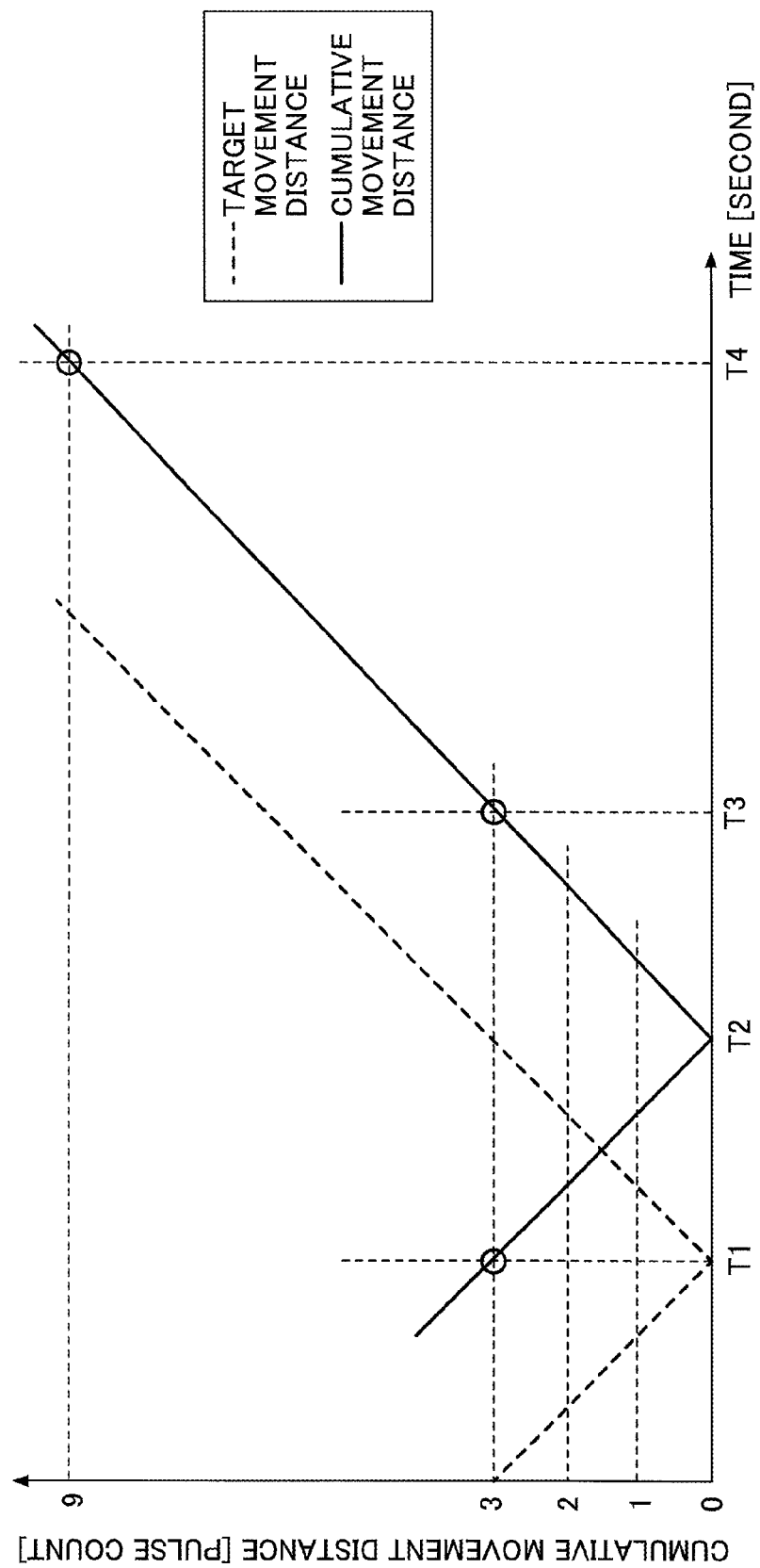
FIG. 7 is a diagram for explaining a method of error detection by an error detection unit according to the embodiment.

FIG. 7 is a diagram for explaining a method of error detection by the error detection unit 315 according to the embodiment. In FIG. 7, an example of computation in which the count of pulses by the pulse counter unit 336 is expressed as a cumulative movement distance of the target object driven by the DC motor 400 is illustrated.

As indicated by the dotted line in FIG. 7, the target movement distance is changed at time T1 by controlling the DC motor 400 such that the rotation of the DC motor 400 changes from reverse rotation to normal rotation at time T1. However, a cumulative movement distance of the object driven by the DC motor 400 is changed such that the reverse rotation is changed to the normal rotation at time T2, as indicated by the solid line in FIG. 7.

In the example of FIG. 7, the sampling unit 316 receives the counts output by the pulse counter unit 336 according to the rotation of the DC motor 400 at intervals of the reference period. The error detection unit 315 computes a difference between the present count and the previously received count each time the sampling unit 316 receives the count. The error detection unit 315 detects an error in the encoder sensor 333 and the code wheel 334 in the rotation detection unit when the computed difference is continuously less than the reference value. For example, when the computed difference is less than the reference value twice or more in succession, it is detected that an error arises.

Specifically, the sampling unit 316 receives the counts at the intervals of the reference period (the times T1, T3, and T4) as indicated by the white circles in FIG. 7. If the sampling unit 316 receives the count at the time T3, the error detection unit 315 computes a difference between the count received at the time T3 and the count received at the time T1. If the sampling unit 316 receives the count at the time T4, the error detection unit 315 computes a difference between the count received at the time T4 and the count received at the time T3.

In the example shown in FIG. 7, the count difference computed at the time T3 is equal to zero because the rotation of the DC motor 400 has been changed from reverse rotation to normal rotation at the time T2. However, in reality, the rotation of the DC motor 400 is continuously held in normal rotation for the period from the time T3 to the time T4, the cumulative movement distance of the object is increased, and the count difference computed at the time T4 is equal to 6 (=9−3).

If the reference value the error detection unit 315 compares the computed count difference is set to 3, the count difference computed at the time T3 is less than the reference value but the count difference computed at the time T4 is greater than the reference value.

In this case, although the rotation of the DC motor 400 is changed from reverse rotation to normal rotation at the time T2, the count difference computed is not continuously less than the reference value. Hence, the error detection unit 315 detects that an error does not arise in the encoder sensor 333 and the code wheel 334, and the drive control of the DC motor 400 by the motor control device 300 is continued.

In this manner, the error detection unit 315 detects that an error does not arise in the encoder sensor 333 and the code wheel 334, unless the computed difference is continuously less than the reference value. Hence, even when the sampling unit 316 receives the counts at the time T1 and the time T3 before and after the time T2 when the rotation of the DC motor 400 is changed from reverse rotation to normal rotation, the count difference computed at the time T4 exceeds the reference value, and the error detection unit 315 detects that an error does not arise in the encoder sensor 333 and the code wheel 334.

The reference value with which the error detection unit 315 compares the computed count difference is not limited to the above-described example and may be suitably determined according to the setup conditions of the DC motor 400, the encoder sensor 333, and the code wheel 334.

Figure 8:
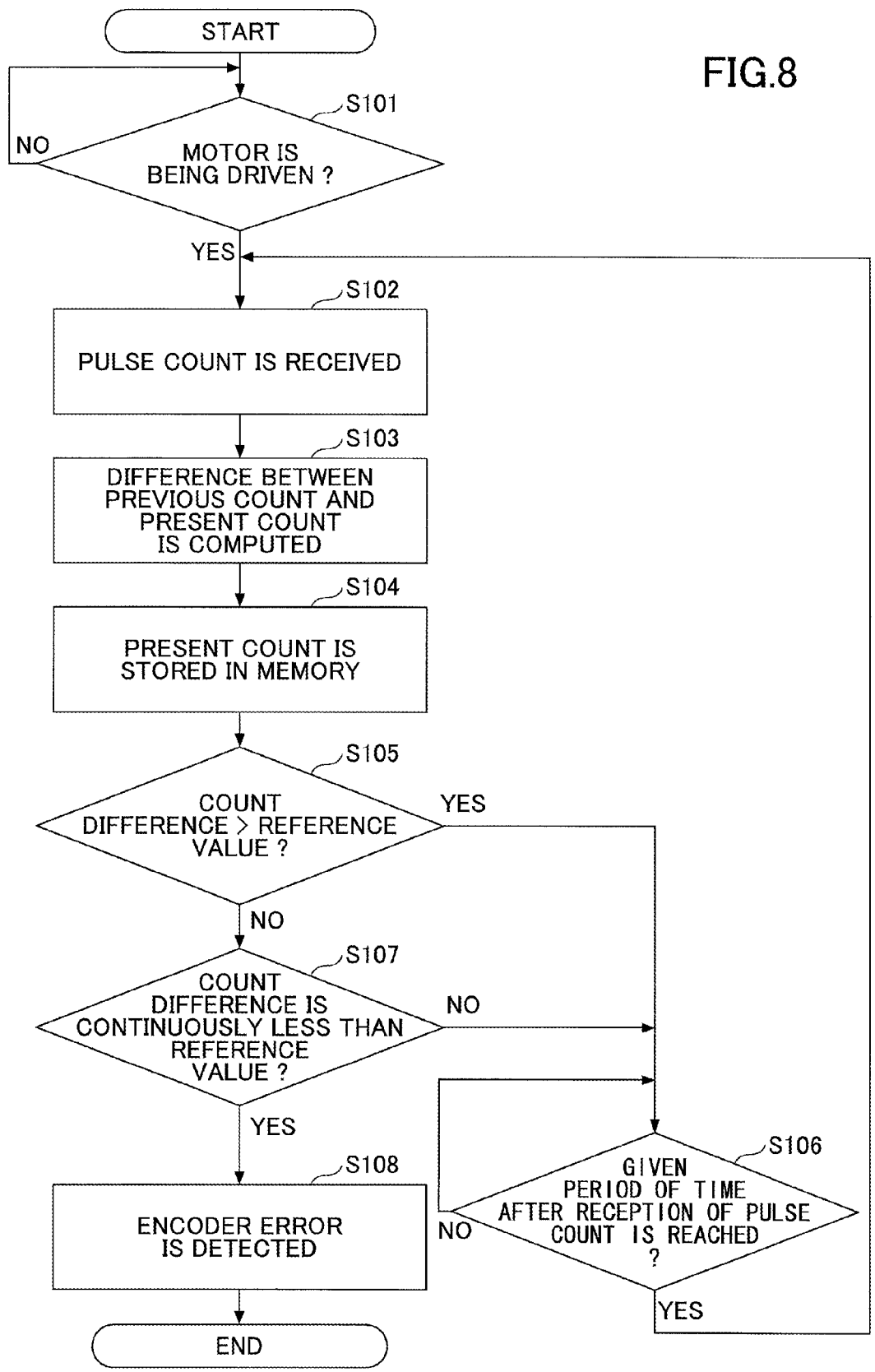
FIG. 8 is a flowchart for explaining an error detection process performed by the motor control device according to the embodiment.

FIG. 8 is a flowchart for explaining an error detection process performed by the motor control device according to the embodiment.

As shown in FIG. 8, upon a start of the error detection process, in step S101, the motor control unit 310 determines whether the DC motor 400 is being driven. When the DC motor 400 is being driven in step S101, the following step S102 is performed.

In step S102, the sampling unit 316 receives the pulse count as a result of the counting of the pulses output from the pulse output unit 335 according to the rotation of the DC motor 400 by the pulse counter unit 336.

In step S103, the error detection unit 315 computes a difference between the present count received by the sampling unit 316 in step S102 and the previously received count. Subsequently, in step S104, the sampling unit 316 stores the present count received from the pulse counter unit 336 into the RAM 313.

Subsequently, in step S105, the error detection unit 315 compares the computed count difference with the predetermined reference value, and determines whether the count difference is greater than the reference value.

When the count difference is greater than the reference value in step S105, the motor control device 300 in step S106 is set in a waiting state until an elapsed time after the count from the pulse counter unit 336 is received by the sampling unit 316 reaches a predetermined time. When the elapsed time reaches the predetermined time, the control goes to the step S102.

When the count difference is not greater than the reference value in step S105, the error detection unit 315 in step S107 determines whether the count difference is continuously less than the reference value.

When the count difference is not continuously less than the reference value in step S107, the control goes to the step S106.

When the count difference is continuously less than the reference value in step S107, the error detection unit 315 in step S108 detects that an error arises in the encoder sensor 333 and the code wheel 334. Then, the error detection process is terminated. For example, when the encoder error is detected, the drive control of the DC motor 400 is stopped and an error handling process including error displaying is performed.

As described above, according to the embodiment, the pulse counter unit 336 counts the pulses output from the encoder sensor 333 by summation or subtraction according to the rotational direction of the DC motor 400, and the sampling unit 316 receives the counts at intervals of the reference period. The error detection unit 315 computes a difference between the present count and the previously received count, and detects that an error arises in the encoder sensor 333 and the code wheel 334, when the count difference computed is continuously less than the reference value.

In the error detection method according to the embodiment, even when the drive control of the DC motor 400 is performed such that the rotational direction of the DC motor 400 is changed, false detection of an error in the encoder sensor 333 and the code wheel 334 may be prevented. Therefore, the drive control of the DC motor 400 may be continuously performed without stopping the DC motor 400 due to false detection of an encoder error.

Note that the functions of the motor control device 300 according to the embodiment are implemented by the CPU 311 of the motor control unit 310 executing the motor control program stored in the ROM 312 or the RAM 313. The motor control program may be configured in an installable form or executable form that is stored in a computer-readable storage medium, such as a CD-ROM, a flexible disk, a CD-R, a DVD (digital versatile disk).

In addition, the motor control program to be executed by the CPU 311 of the motor control unit 310 according to the embodiment may be installed in the motor control device 300 or in a computer connected to the motor control device 300 via a network. The motor control program to be executed by the CPU 311 of the motor control unit 310 according to the embodiment may be downloaded or distributed through a network such as the Internet.

As described in the foregoing, according to the motor control device of the present invention, it is possible to prevent false detection of an encoder error.

The motor control device according to the invention is not limited to the above-described embodiments and variations and modifications may be made without departing from the scope of the present invention.

The present application is based upon and claims the benefit of priority of Japanese Patent Application No. 2013-085704, filed on Apr. 16, 2013, and Japanese Patent Application No. 2014-040238, filed on Mar. 3, 2014, the contents of which are incorporated herein by reference in their entirety.

What is claimed is:

1. A motor control device which performs drive control of a motor connected to an object, comprising:

a rotation detection unit that detects rotation of the motor and outputs a detection signal;

a counter unit that receives the detection signal from the rotation detection unit and outputs a count based on the received detection signal; and an error detection unit that receives counts from the counter unit at intervals of a reference period, computes a difference between a present count received from the counter unit and a previously received count, and detects that an error arises in the rotation detection unit when the difference is continuously less than a reference value.

2. The motor control device according to claim 1, wherein the rotation detection unit comprises a rotary encoder that outputs two-phase pulses with different phase angles.

3. The motor control device according to claim 1, wherein the counter unit increments the count during normal rotation of the motor and decrements the count during reverse rotation of the motor.

4. The motor control device according to claim 1 wherein the reference period is set based on a movement distance of the object driven by the motor.

5. The motor control device according to claim 1 wherein the reference value is set based on an expected movement distance of the object driven by the motor for the reference period.

6. An image forming apparatus comprising:

an image formation unit that forms an image; and the motor control device according to claim 1.

7. A motor control method performed by a motor control device which performs drive control of a motor and includes a rotation detection unit that detects rotation of the motor and outputs a detection signal, the method comprising:

receiving, by a counter unit, the detection signal from the rotation detection unit to output a count based on the received detection signal;

receiving, by an error detection unit, counts from the counter unit at intervals of a reference period;

computing, by the error detection unit, a difference between a present count received from the counter unit and a previously received count; and detecting, by the error detection unit, that an error arises in the rotation detection unit when the difference is continuously less than a reference value.

8. A non-transitory computer-readable medium storing a program which when executed by a computer causes the computer to perform the motor control method according to claim 7.

* * * * *